US012434491B2

(12) United States Patent
Nakaya et al.

(10) Patent No.: US 12,434,491 B2
(45) Date of Patent: Oct. 7, 2025

(54) PRINTING APPARATUS HAVING DRYING UNIT AND DRYING CONTROL METHOD

(71) Applicant: CANON KABUSHIKI KAISHA, Tokyo (JP)

(72) Inventors: Yusuke Nakaya, Tokyo (JP); Masahiro Sugimoto, Kanagawa (JP); Ryosuke Sato, Kanagawa (JP); Kengo Nieda, Kanagawa (JP); Shunya Sunouchi, Tokyo (JP); Yuichiro Yanagi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 18/542,319

(22) Filed: Dec. 15, 2023

(65) Prior Publication Data

US 2024/0198695 A1 Jun. 20, 2024

(30) Foreign Application Priority Data

Dec. 20, 2022 (JP) ................................ 2022-203763

(51) Int. Cl.
*B41J 11/00* (2006.01)

(52) U.S. Cl.
CPC ................................ *B41J 11/0022* (2021.01)

(58) Field of Classification Search
CPC .................................................. B41J 11/0022
See application file for complete search history.

(56) References Cited

U.S. PATENT DOCUMENTS

2010/0188455 A1* 7/2010 Shinkawa ............. B41J 29/377 347/102

FOREIGN PATENT DOCUMENTS

JP 2010082937 A 4/2010
JP 2013029268 A 2/2013

* cited by examiner

*Primary Examiner* — Bradley W Thies

(74) *Attorney, Agent, or Firm* — Canon U.S.A., Inc. IP Division

(57) ABSTRACT

An inkjet printing apparatus includes a printing unit to print on a printing medium and a drying unit to dry the printing medium. The drying unit includes an air blower having an entry and an exit, a heater to heat air from the blower exit, a casing, first and second collection paths, and an exhaust amount regulator as a regulation value disposed in each of the first and second collection paths. The casing includes a first portion to communicate with the heater, and includes a second portion to communicate with the first portion and to pass the printing medium through the second portion. The exhaust amount regulator switches between a first regulation state in which air circulates through the first portion and the first collection path and a second regulation state in which air circulates through the second portion and the second collection path.

10 Claims, 10 Drawing Sheets

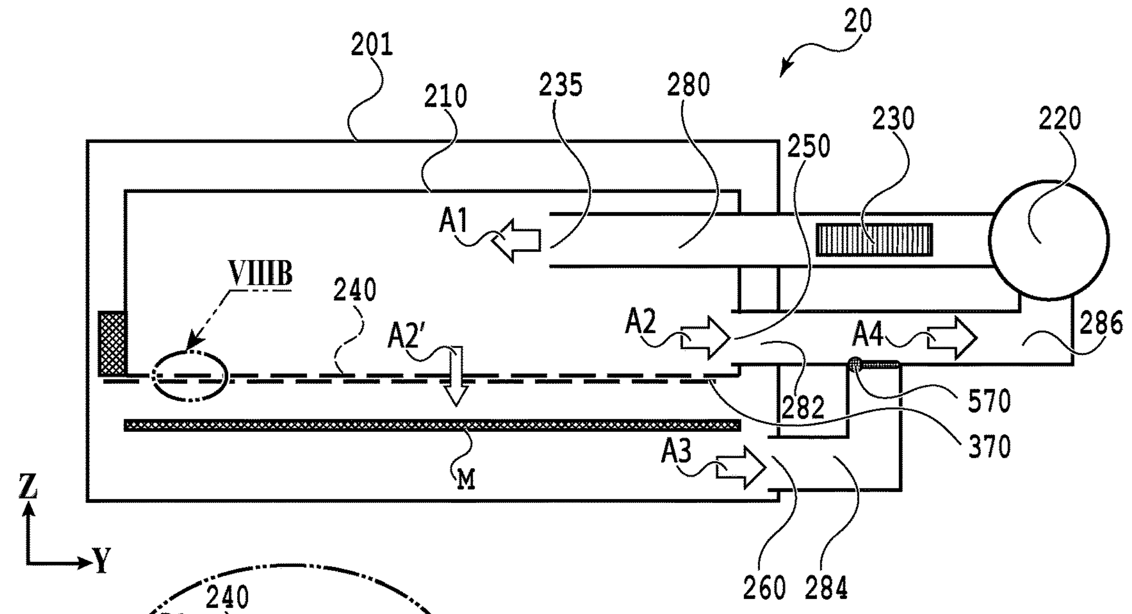
FIG.8A
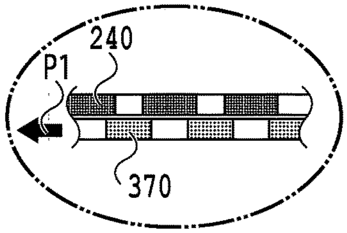
FIG.8B
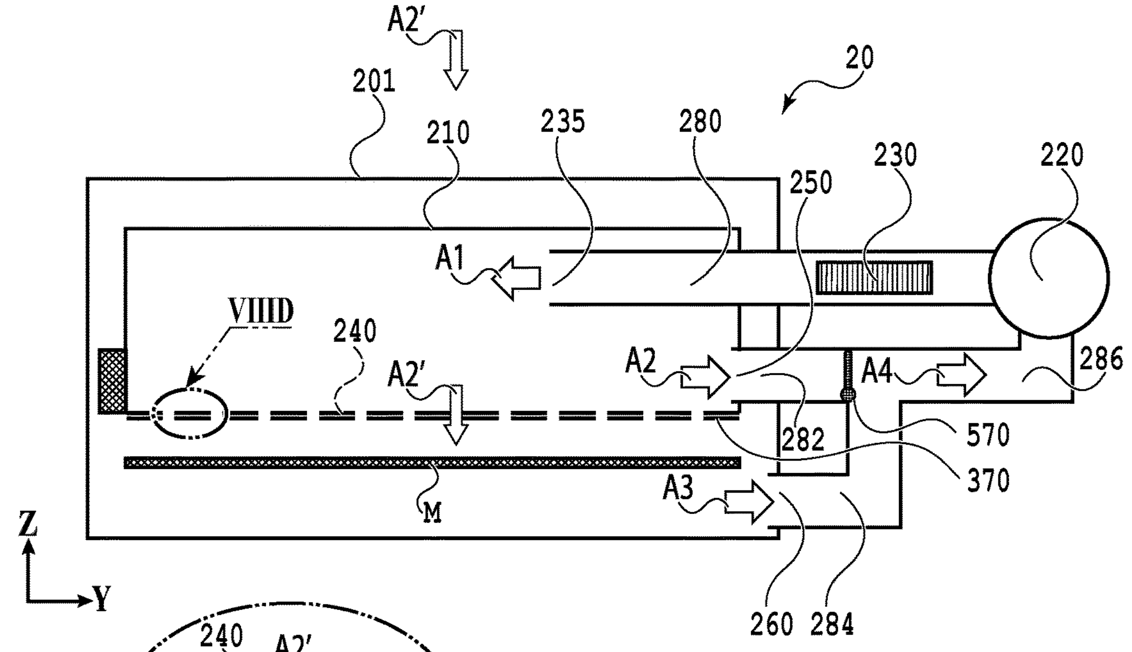
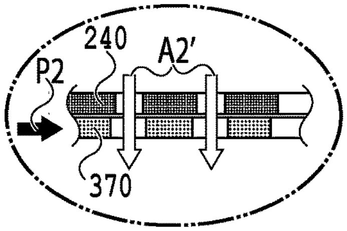
FIG.8C
FIG.8D

PRINTING APPARATUS HAVING DRYING UNIT AND DRYING CONTROL METHOD

BACKGROUND

Field

The present disclosure relates to a printing apparatus having a drying unit and to a drying control method.

Description of the Related Art

Inkjet printing apparatuses that print an image on a printing medium using the inkjet method have been conventionally known. A technique of blowing hot air against a printing medium printed with ink to dry the ink is known to be used in an inkjet printing apparatus. Japanese Patent Laid-Open No. 2010-082937 (called Literature 1 below) discloses a technique of drying a printing medium by circulating hot air in a casing of a drying unit with the printing medium being present on a conveyance surface of the casing. What is disclosed is a configuration in which while there is no printing medium in the casing, air to be heated and circulated in the casing is heated with a temperature higher than the temperature for drying the printing medium in order to shorten the heating time. In the technique in Literature 1, the heating time cannot be shortened while a printing medium is in the casing.

SUMMARY

What is sought is a technique for shorting heating time even while a printing medium may be in the casing.

According to an aspect of the present disclosure, an inkjet printing apparatus includes a printing unit configured to perform printing by ejecting ink to a printing medium, and a drying unit configured to dry the printing medium, wherein the drying unit includes an air blower having an entry and an exit, a heater configured to heat air sent from the exit of the air blower, a casing having a first portion configured to communicate with the heater, and a second portion that is configured to communicate with the first portion and is configured to pass the printing medium through the second portion, a first collection path configured to communicate with the first portion and the entry of the air blower, a second collection path configured to communicate with the second portion and the entry of the air blower, and an exhaust amount regulator configured to switch between a first regulation state in which air circulates through the first portion and the first collection path and a second regulation state in which air circulates through the second portion and the second collection path, wherein the exhaust amount regulator is a regulation value disposed in each of the first and second collection paths.

Further features of the present disclosure will become apparent from the following description of exemplary embodiments with reference to the attached drawings.

BRIEF DESCRIPTION OF THE DRAWINGS

FIG. 8A is a schematic sectional view showing an exhaust amount regulator in a fourth embodiment;

FIG. 8B is a schematic sectional view showing an exhaust amount regulator in a fourth embodiment;

FIG. 8C is a schematic sectional view showing an exhaust amount regulator in a fourth embodiment;

FIG. 8D is a schematic sectional view showing an exhaust amount regulator in a fourth embodiment;

DESCRIPTION OF THE EMBODIMENTS

A drying unit of a printer dries a printing medium using a drying temperature and heats air in a casing using a heating temperature. By making the heating temperature higher than the drying temperature, the time it takes for the air in the drying unit to reach the drying temperature is shortened. However, a high heating temperature with a printing medium in the casing causes air at the high heating temperature to flow toward the printing medium in the casing due to air circulation in a step of bringing the temperature to the drying temperature, and part of the air at the high heating temperature acts on the printing medium.

In drying of a cut sheet of paper, sheet conveyance to the drying unit is intermittent, and therefore, in the intervals, air in the casing of the drying unit can be heated at a temperature higher than the drying temperature. Meanwhile, in drying of a roll of paper, in a case where the temperature in the drying unit drops, a need arises to heat the air with a sheet being present in the casing because there is no timing of sheet breaks. Thus, the heating temperature cannot be higher than the drying temperature.

The following describes embodiments of the present disclosure in concrete terms with reference to the drawings. In the present disclosure, an X-axis, a Y-axis, and a Z-axis are used appropriately as axes of directions used to illustrate, e.g., the layout of the inkjet printing apparatus. The X-axis and the Y-axis are orthogonal to each other on the horizontal plane. The Z-axis is a vertical axis orthogonal to the X-axis and the Y-axis. As will be described later, the X-axis is the same as the direction in which a printing medium travels in conveyance of the printing medium.

First Embodiment (Printing Apparatus)

A printing apparatus 1 of the present disclosure is a high-speed line printer that uses a rolled continuous printing medium and is suitable for, e.g., mass printing or large-format printing. A printing apparatus having a drying unit and a drying control method of the present disclosure may be used for printers using latex ink, water pigment, solvent ink, or the like.

Figure 1:
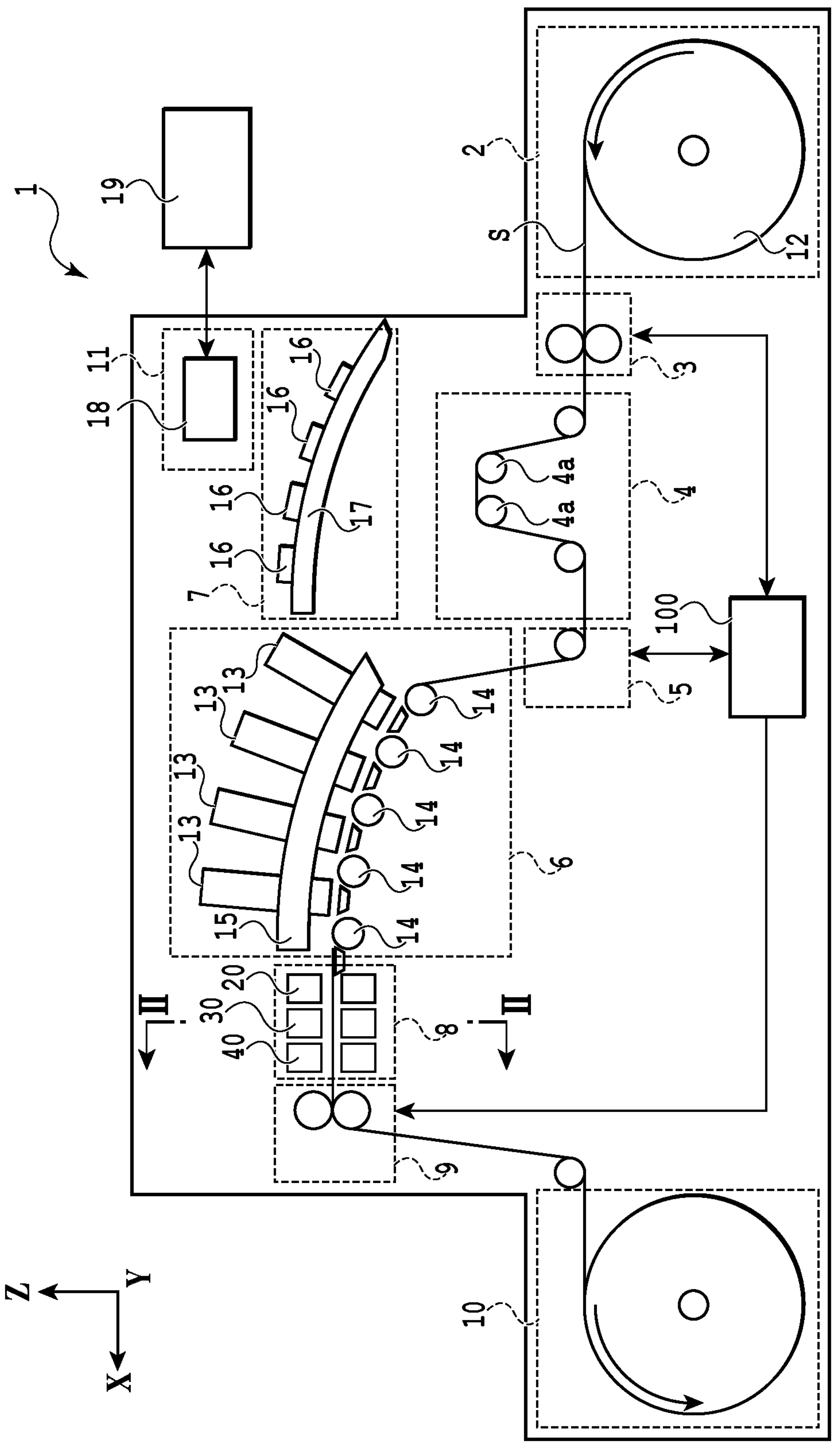
FIG. 1 is a schematic sectional view showing the configuration of a printing apparatus according to the present embodiments during printing.

FIG. 1 is a schematic sectional view showing an internal configuration of the printing apparatus 1. The direction in which a printing medium is conveyed is the X-axis direction, and the width direction of a printing medium is parallel to the Y-axis direction. The printing apparatus of the present embodiment includes the following units: a printing medium supply unit 2, a first conveyance roller pair 3, a meandering correction unit 4, a tension detection unit 5, a printing unit 6, a head cleaning unit 7, a post-treatment unit 8, a second conveyance roller pair 9, a printing medium collection unit 10, a control unit 11, and a host apparatus 19. A printing medium M is conveyed along a printing medium conveyance route indicated by the solid line S in FIG. 1 and is processed by each unit.

The printing medium supply unit 2 is a unit for holding and supplying the printing medium M. The printing medium M may be rolled into the shape of a roll 12. The printing medium supply unit 2 includes the roll 12 and draws the printing medium M from the roll 12 and supplies the printing medium M. Two or more rolls may be housed in the supply unit 2, and the supply unit 2 may select one of the plurality of rolls and supply the printing medium M therefrom. Alternatively, the continuous printing medium M may be in the shape such that, for example, perforations are provided per unit length, bent along the perforations, and stacked.

The first conveyance roller pair 3 is a unit for feeding the printing medium M along the printing medium conveyance route (the solid line S), and the printing medium M is conveyed to pass the meandering correction unit 4, the tension detection unit 5, the printing unit 6, and the post-treatment unit 8, in this order. The first conveyance roller pair 3 applies tension to the printing medium M by cooperating with the second conveyance roller pair 9 to be described later. The first conveyance roller pair 3 is rotated by a motor (not shown) and conveys the printing medium M while applying tension thereto.

The meandering correction unit 4 is a unit for correcting the meandering of the printing medium in the width direction thereof during conveyance of the printing medium M. The meandering correction unit 4 includes meandering correction rollers 4*a* and a meandering detection sensor (not shown) that detects meandering of the printing medium M. The meandering correction rollers 4*a* can be changed in their slant relative to the printing medium M by a motor (not shown) and correct the meandering of a printing medium by changing their slant based on measurements by the meandering detection sensor. In this event, a meandering correction function can be enhanced by the printing medium being wound around the meandering correction rollers 4*a*.

The tension detection unit 5 is a unit for detecting tension applied to the printing medium M between the first conveyance roller pair 3 and the second conveyance roller pair 9. The tension detection unit 5 can detect tension during conveyance of the printing medium M.

The printing unit 6 is a printing medium processing unit that uses printheads 13 to perform printing processing, from above, on the printing medium M being conveyed. Guide rollers 14 arranged to form an arc shape form a conveyance route for the printing medium M. By receiving certain tension and coming into contact with the guide rollers 14 arranged to form an arc shape, the printing medium M has a clearance from the printheads 13. The printheads 13 are, like the conveyance route formed by the guide rollers 14, a plurality of printheads arranged to form an arc shape in the conveyance direction. The plurality of printheads 13 are integrally held by a head holder 15 capable of moving in the Z-axis direction, and the clearance between the printing medium M and the printheads 13 can be changed by the head holder 15 moving in the Z-axis direction.

In the present disclosure, the printheads 13 may be four line-type printheads supporting four colors: Bk (black), Y (yellow), M (magenta), and C (cyan). The number of colors and the number of printheads 13 may be fewer than four or more than four. The inkjet method employed by the printing unit 6 may be a method using heat generating elements, a method using piezoelectric elements, a method using electrostatic elements, a method using MEMS elements, or the like. Ink of each color is supplied to the corresponding printhead 13 from an ink tank (not shown) through an ink tube (not shown).

The head cleaning unit 7 includes cleaning units (not shown) that clean the ink ejection surfaces of the printheads 13 and cap units 16 that keep moisture on the ink ejection surfaces of the printheads 13. Each cap unit 16 shields the ejection nozzles of the printhead 13 from outside air by coming into contact with the ejection nozzles and thereby prevents them from drying out.

The plurality of cleaning units and cap units 16 are arranged to form arc shapes in such a manner as to correspond to the respective printheads 13 and are integrally held by a cleaning holder 17.

The post-treatment unit 8 is a unit that vaporizes moisture contained in the ink applied to a printing medium by the printing unit 6 to enhance the fixation between the printing medium and the ink. The post-treatment unit 8 includes a drying unit 20, a fixation unit 30, and a cooling unit 40.

The drying unit 20 dries ink applied to the printing medium M by heating the printed printing medium M. Details will be described later.

The fixation unit 30 heats, with a predetermined temperature, the printing medium M which has been dried by the drying unit 20, thereby softens and melts the ink, and enhances the fixation of the ink to the printing medium. In the fixation unit 30, hot air is applied, at least from the −Z-axis direction, to the printing medium M passing therethrough to fixate the ink onto the printing medium M. The hot air in the fixation unit 30 may be at a temperature equal to or higher than the temperature of the hot air in the drying unit 20. Alternatively, the fixation method may be a method involving application of electromagnetic waves (such as ultraviolet or infrared rays) to the surface of the printing medium M, a method involving application of heat and pressure by sandwiching the printing medium M with heat generators, or a combination of the above.

The cooling unit 40 cools the printing medium M which has been heated by the fixation unit 30 to solidify the softened ink. Solidifying the ink helps prevent a change in the state of the printing medium and of the ink in the process downstream in the printing apparatus. In the cooling unit 40, the printing medium M being conveyed therethrough is cooled by receiving air at a temperature lower than the printing medium M at least from the −Z-axis direction side. Alternatively, the cooling method may be a heat conduction and transfer method bringing a heat release member into contact, or a combination of the above.

The second conveyance roller pair 9 is a unit that adjusts the tension of the printing medium M in cooperation with the first conveyance roller pair 3 so that the printing medium M may be conveyed under tension. The second conveyance roller pair 9 is rotated by a motor (not shown). A tension control unit 100 adjusts the tension of a printing medium using a clutch (not shown) capable of controlling a drivingly-coupled torque according to a tension value detected by the tension detection unit 5. Alternatively, the tension detection unit 5 may adjust the tension of the printing medium M by controlling the speed of the second conveyance roller pair 9. Two tension control methods may be employed: a torque controlling method which controls a torque value transmitted from the clutch and a speed controlling method which controls the roller speed of the second conveyance roller pair. These two tension control methods may be switched according to the purpose or may be used at the same time.

The printing medium collection unit 10 is a unit for winding in the printing medium M which has undergone the printing processing. The printing medium collection unit 10 has a winding core. Alternatively, the printing medium collection unit 10 may have two or more winding cores and select one of the winding cores to collect the printing medium M. Note that depending on the type of processing the printing medium M will be subjected to after the printing, the following configuration may be employed instead of the configuration in which the printing medium M is wound around the winding core. Specifically, the continuous printing medium M may be cut using a cutter, and cut pieces of the printing medium M may be stacked.

The control unit 11 is a unit that performs overall control of the units of the printing apparatus. The control unit 11 has a controller including a CPU, a storage apparatus, and various control units, an external interface, and an operation unit 18 for user input and output. The operation of the printing apparatus 1 is controlled based on commands from the controller or from the host apparatus 19 connected to the controller via the external interface, such as a hot computer.

(Drying Unit)

Figure 2:
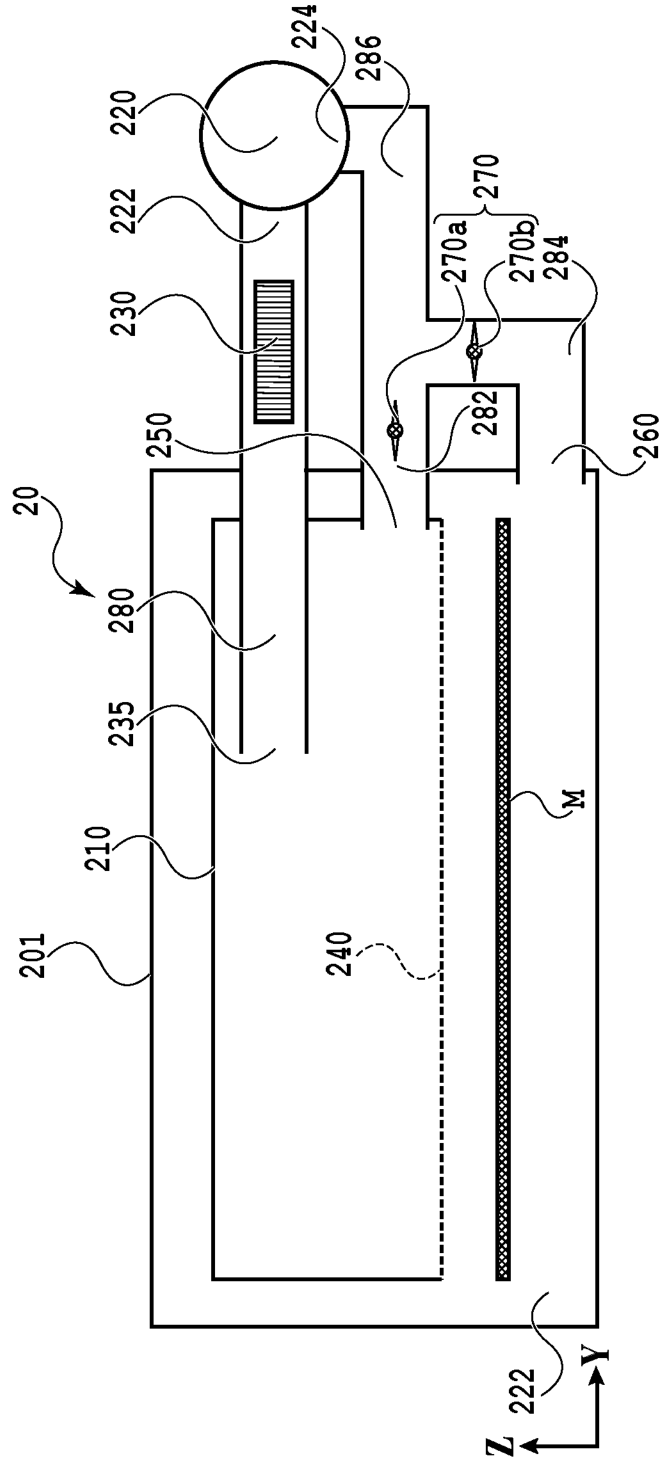
FIG. 2 is a schematic sectional view showing an example configuration of a drying unit.

FIG. 2 is a sectional view of the drying unit 20 seen in the printing medium conveyance direction. The following describes the configuration of the drying unit 20 in more detail. The drying unit 20 includes a casing 201, a supply path 280 having a hot air supply port 235, a first collection path 282 having a first exhaust port 250, a second collection path 284 having a second exhaust port 260, and a merge path 286 communicating with the first collection path 282 and the second collection path 284.

The casing 201 has a first portion 210 (also referred to as a "pressure chamber") and a second portion 222. The casing 201 has a vent surface 240 provided between the first portion 210 and the second portion 222. The vent surface 240 has a plurality of opening portions 245 communicating with the first portion 210 and the second portion 222. The printing medium M is conveyed through the second portion 222.

The hot air supply port 235 and the first exhaust port 250 are disposed at the first portion 210, and the second exhaust port 260 is disposed at the second portion 222.

An air blower 220 is disposed between the supply path 280 and the merge path 286. An exit 222 of the air blower 220 communicates with the supply path 280, while an entry 224 of the air blower 220 communicates with the merge path 286. A heater 230 is disposed inside the supply path 280. The heater 230 is provided with a temperature detection unit (not shown). Heating of the heater 230 is controlled according to a predetermined hot air temperature based on the temperature detected by the temperature detection unit. Air supplied from the air blower 220 to the first portion 210 is heated by the heater 230, and is sent back to the air blower 220 from the first exhaust port 250 or the second exhaust port 260. A pressure difference generated by the air blower causes air to circulate, and the first portion 210 may be pressurized.

An exhaust amount regulator 270 is disposed in the first collection path 282 and the second collection path 284. As will be described later, the exhaust amount regulator 270 causes air to be circulated in the drying unit between the air blower 220 and the first portion 210 in a first regulation state and between the air blower 220, the first portion 210, and the second portion 222 in a second regulation state. Circulating and heating air in the drying unit 20 may reduce the amount of heat to be applied by the heater 230 and cut down power consumption. The exhaust amount regulator 270 may be disposed in one of the first collection path 282 and the second collection path 284.

Figure 3:
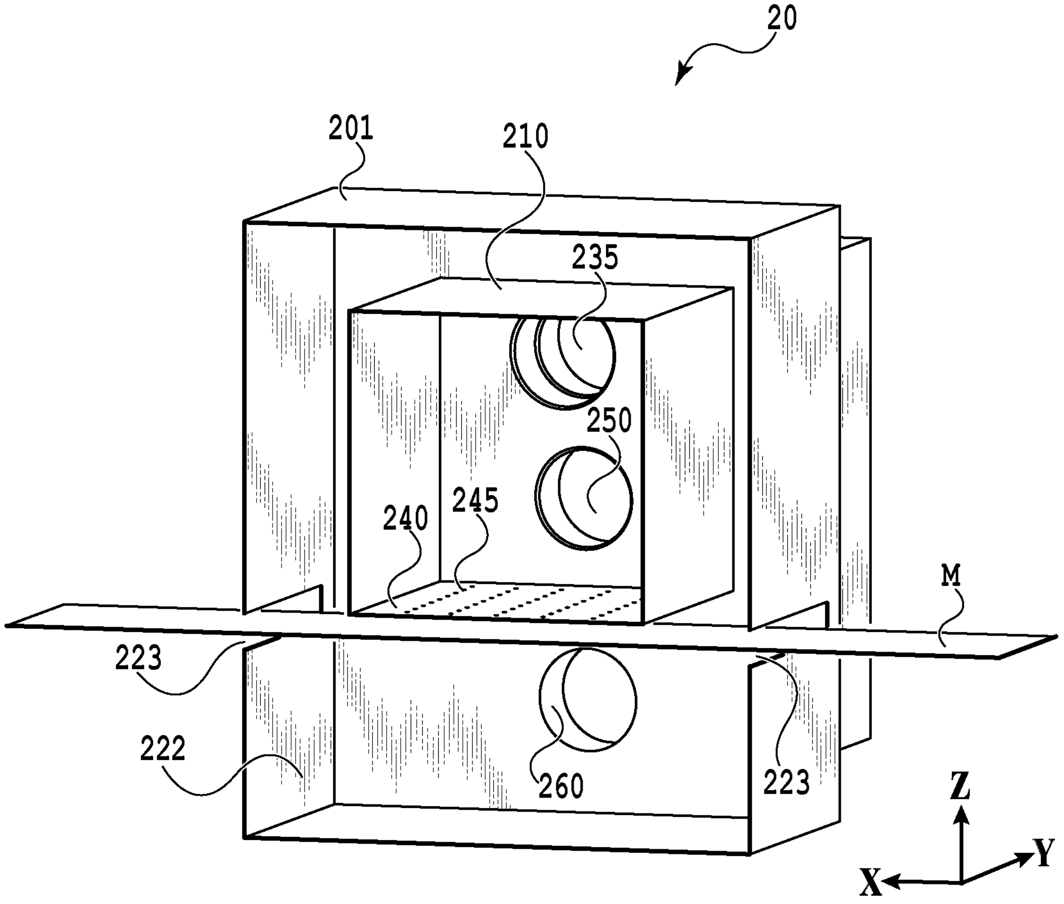
FIG. 3 is a perspective sectional view showing an example configuration of the drying unit.

FIG. 3 is a sectional perspective view showing the internal structure of the drying unit 20. The second portion 222 defines two opening portions 223 to allow conveyance of a printing medium therethrough. The printing medium M is conveyed through the opening portions 223 at a distance from the vent surface 240. The vent surface 240 has the plurality of opening portions 245 with a small diameter (e.g., 2 mm to 5 mm). Hot air supplied to the first portion 210 flows from the first portion 210 to the second portion 222 through the plurality of opening portions 245 of the vent surface 240 and is blown against the printing medium M evenly. The plurality of opening portions 245 of the vent surface 240 may be round holes, linear slit holes, or a combination thereof.

While the printing medium M is being dried, the humidity inside the casing 201 of the drying unit is increased by evaporation of the moisture of the ink applied to the printing medium M. Because excessively high humidity decreases the drying efficiency, the casing 201 includes an air ventilator (not shown) in every embodiment of the present disclosure. Periodically changing the air inside the casing 201 using the air ventilator may help control humidity increase.

Figure 4A:
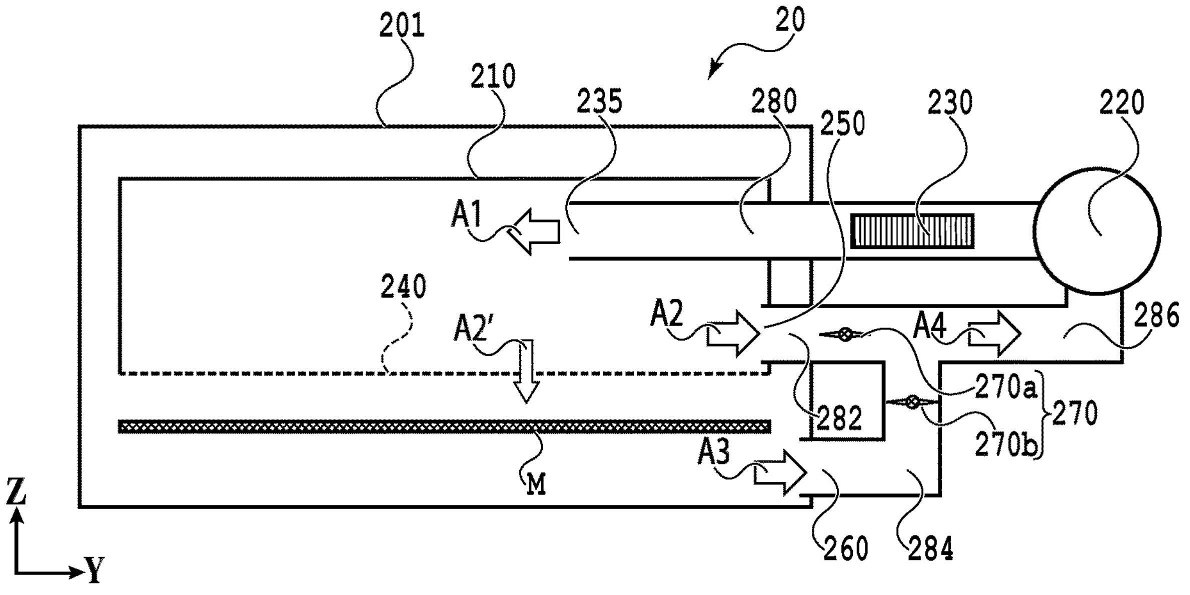
FIG. 4A is a schematic sectional view showing a hot air circulation route in the drying unit in a first embodiment.
Figure 4B:
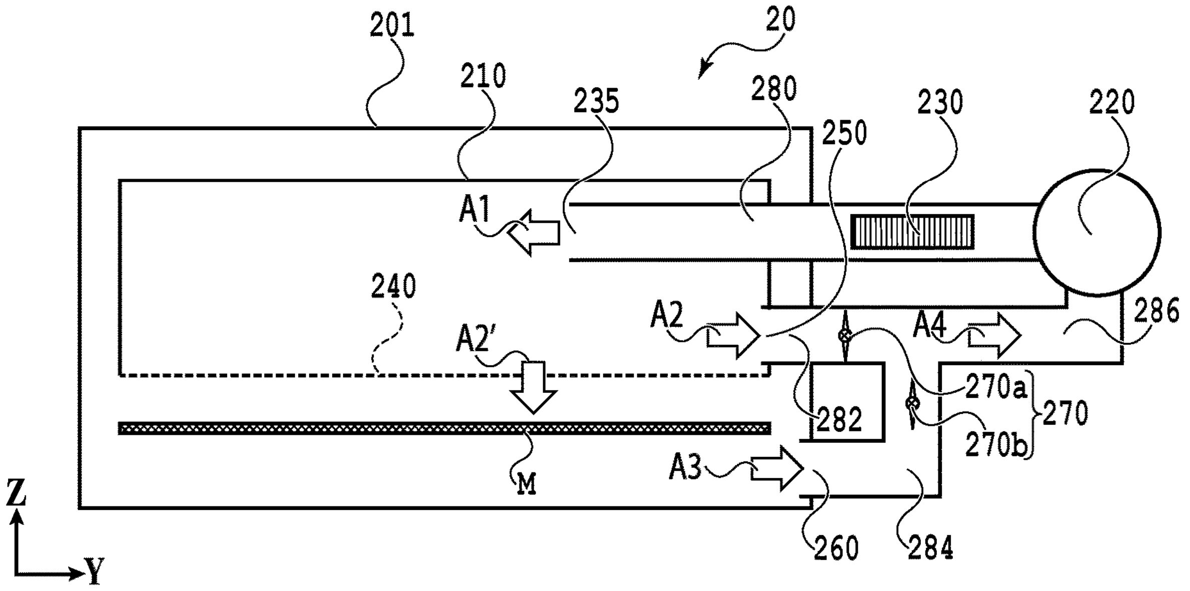
FIG. 4B is a schematic sectional view showing a hot air circulation route in the drying unit in a first embodiment.

FIGS. 4A and 4B are sectional views depicting the direction of airflow in the drying unit 20 in the first embodiment. FIG. 4A shows the first regulation state, and FIG. 4B shows the second regulation state. In the first embodiment, the exhaust amount regulator 270 includes a first regulation valve 270*a* provided in the first collection path and a second regulation valve 270*b* provided in the second collection path. The first regulation valve 270*a* and the second regulation valve 270*b* are butterfly valves, and the control unit 11 controls these valves to switch the regulation state.

In the first regulation state, the first regulation valve 270*a* is open, the second regulation valve 270*b* is closed, and air is circulated and heated through the air blower 220 and the first portion 210 (FIG. 4A). Meanwhile, in the second regulation state, the first regulation valve 270*a* is closed, the second regulation valve 270*b* is open, and hot air is circulated through the air blower 220, the first portion 210, and the second portion 222 (FIG. 4B).

FIG. 4A illustrates the flow of air in the first regulation state. In the first regulation state, the air blower 220 sends air through the supply path 280, and the air supplied from the air blower 220 is heated by the heater 230 and sent in direction A1 while being heated. In this state, the heating temperature for the heater 230 may be set to a temperature higher than the temperature for heating the printing medium.

Meanwhile, movement of hot air in direction A2' is restricted because the second regulation valve 270*b* is closed and the opening portions provided in the vent surface 240 are small, restricting the flow amount. Thus, hot air circulates in the first portion 210 and moves in direction A2 from the first exhaust port 250. Air exhausted from the first exhaust port 250 is sent in direction A4 through the first regulation valve 270*a* and is returned to the air blower 220. Thus, in the first regulation state, hot air is circulated and heated between the air blower 220 and the first portion 210.

FIG. 4B illustrates the flow of air in the second regulation state. In the second regulation state, the first regulation valve 270*a* is closed, and the second regulation valve 270*b* is open. Air supplied from the air blower 220 is heated by the heater 230 and is sent in direction A1 as hot air. In this state, the heating temperature for the heater 230 may be set to the temperature for heating the printing medium.

Movement of hot air in direction A2 is restricted in the second regulation state because the first regulation valve 270*a* is closed and the second regulation valve 270*b* is open. Thus, hot air flows in direction A2' through the plurality of opening portions 245 of the vent surface 240, flows into the second portion 222, heats the printing medium, and is then exhausted from the second exhaust port 260 in direction A3. The air exhausted from the second exhaust port 260 is sent in direction A4 through the second regulation valve 270*b* and is returned to the air blower 220. Thus, in the second regulation state, hot air is circulated between the air blower 220, the first portion 210, and the second portion 222 and heats and dries the printing medium M.

Modification of the First Embodiment

Figure 5:
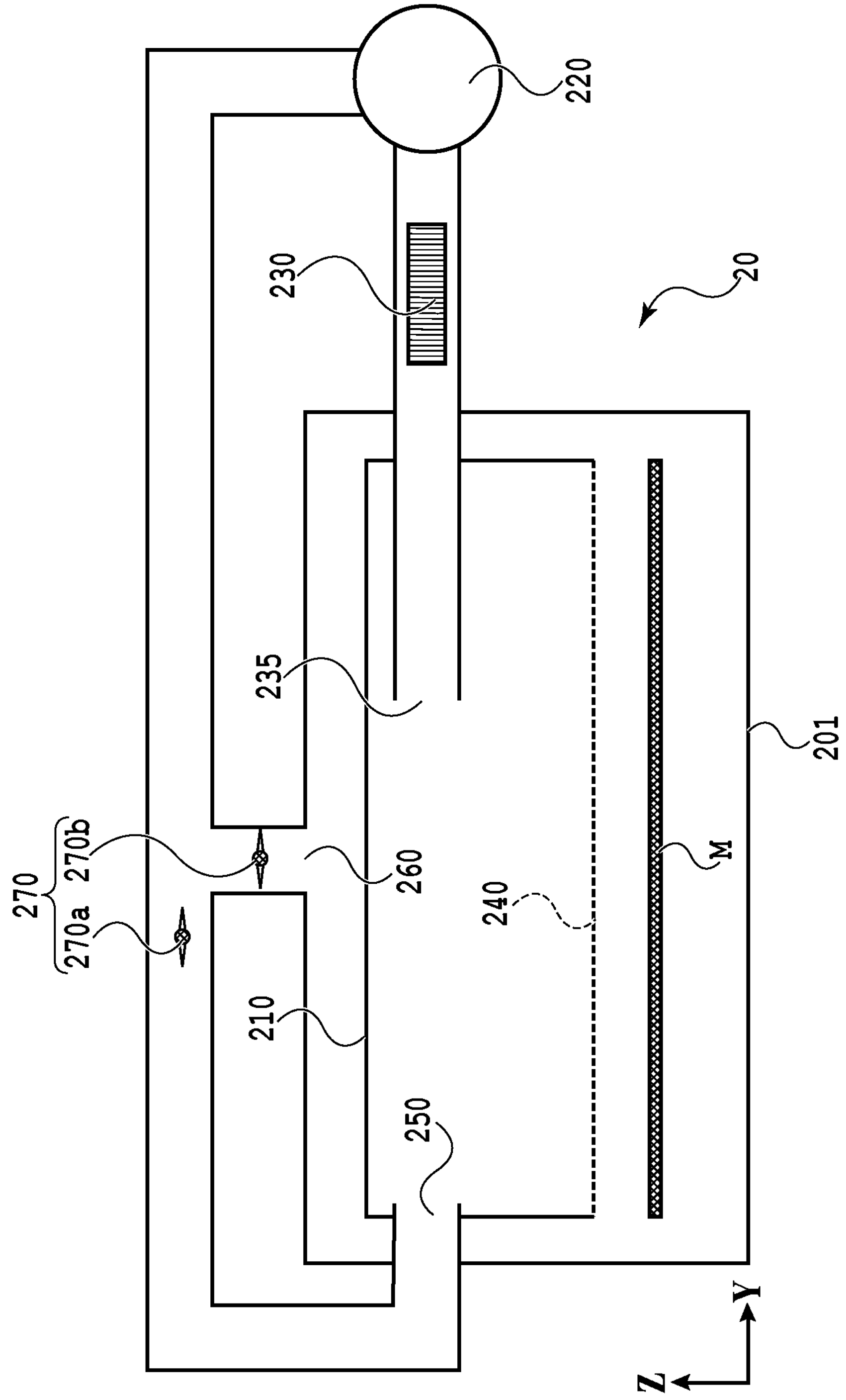
FIG. 5 is a schematic sectional view showing an example configuration of a drying unit in a modification of the first embodiment.

The first exhaust port 250 and the second exhaust port 260 may be placed at any positions, and there may be a plurality of them. For example, the configuration shown in FIG. 5 may be employed in which the first exhaust port 250 is at a position facing the hot air supply port 235 and the second exhaust port 260 is at a position on the top surface of the casing 201. According to the configuration in FIG. 5, hot-air inductivity can be improved in the first regulation state. Also, because the hot air rises in the casing 201, collectability of the hot air from the second exhaust port 260 can be improved.

Second Embodiment

Figure 6A:
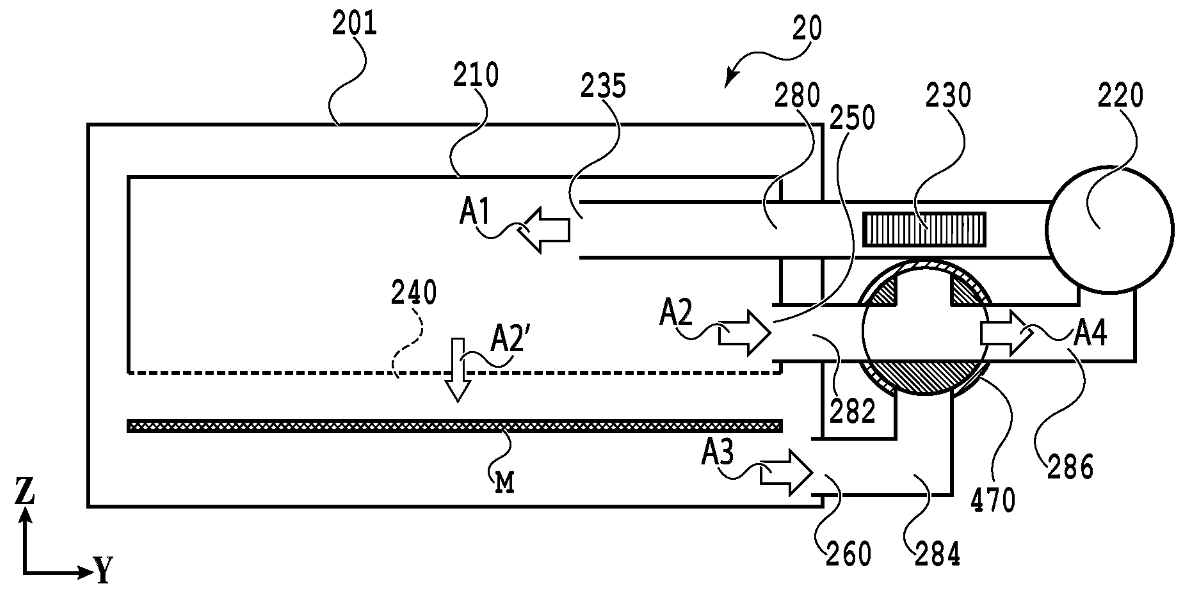
FIG. 6A is a schematic sectional view showing an exhaust amount regulator in a second embodiment.
Figure 6B:
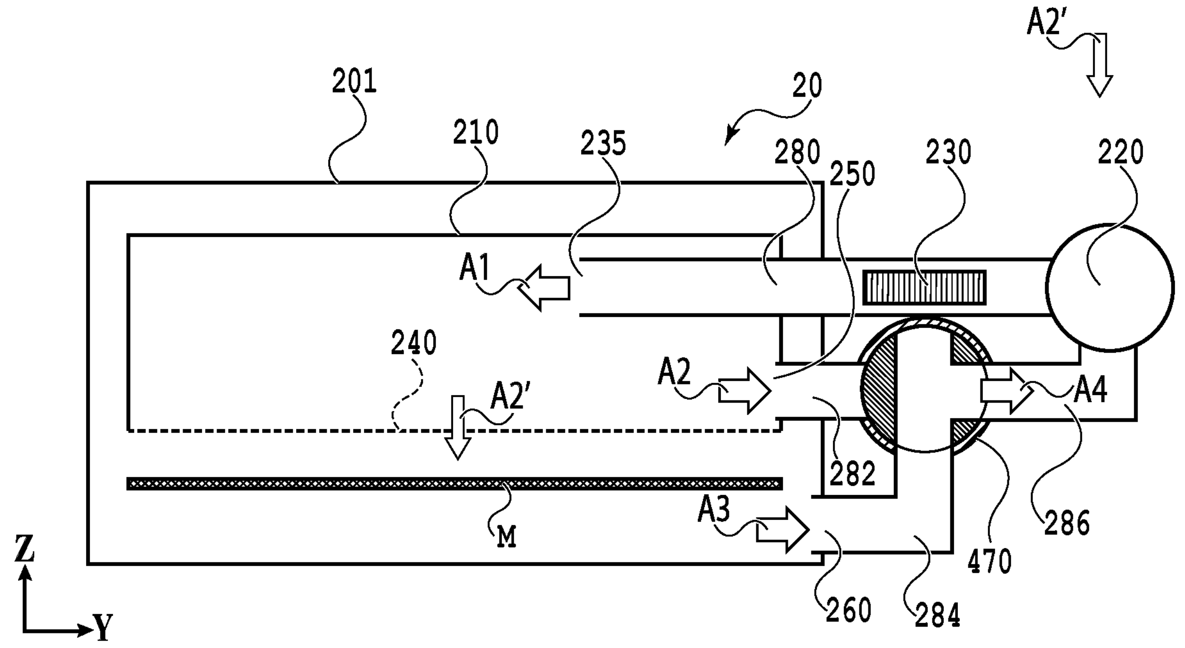
FIG. 6B is a schematic sectional view showing an exhaust amount regulator in a second embodiment.

FIGS. 6A and 6B are sectional views depicting the direction of airflow in the drying unit 20 in a second embodiment. In the present embodiment, the drying unit 20 includes, as an exhaust amount regulator, a three-way valve 470 disposed in and across the first and second collection paths and configured to switch between the first collection path connecting the first exhaust port 250 to the air blower 220 and the second collection path connecting the second exhaust port 260 to the air blower 220. The three-way valve 470 can switch the regulation state with its valve turning angle. FIG. 6A shows the first regulation state, and FIG. 6B shows the second regulation state.

In the first regulation state shown in FIG. 6A, the three-way valve 470 opens the first collection path 282 and closes the second collection path 284. Air supplied from the air blower 220 is heated by the heater 230 and is sent in direction A1 as hot air. In this state, the heating temperature for the heater 230 may be set to a temperature higher than the temperature for heating the printing medium. Because the three-way valve 470 opens the first collection path 282 and closes the second collection path 284, the hot air is next sent in direction A2 from the first exhaust port 250. Air exhausted from the first exhaust port 250 is sent in direction A4 through the three-way valve 470 and is returned to the air blower 220. Thus, in the first regulation state, hot air is circulated and heated between the air blower 220 and the first portion 210.

In the second regulation state shown in FIG. 6B, the three-way valve 470 closes the first collection path 282 and opens the second collection path 284. Air supplied from the air blower 220 is heated by the heater 230 and sent in direction A1 as hot air. In this state, the heating temperature for the heater 230 may be set to the temperature for heating the printing medium. Because the three-way valve 470 closes the first collection path 282 and opens the second collection path 284, hot air sent to the first portion 210 is sent in direction A2', flows into the second portion through the vent surface 240, heats the printing medium M, and is then sent in direction A3 from the second exhaust port 260. Air exhausted from the second exhaust port 260 is sent in direction A4 through the three-way valve 470 and is returned to the air blower 220. Thus, in the second regulation state, hot air is circulated between the air blower 220, the first portion 210, and the second portion 222 to heat and dry the printing medium M. According to the present embodiment, the single three-way valve 470 can be used as the exhaust amount regulator to switch the regulation state.

Third Embodiment

Figure 7A:
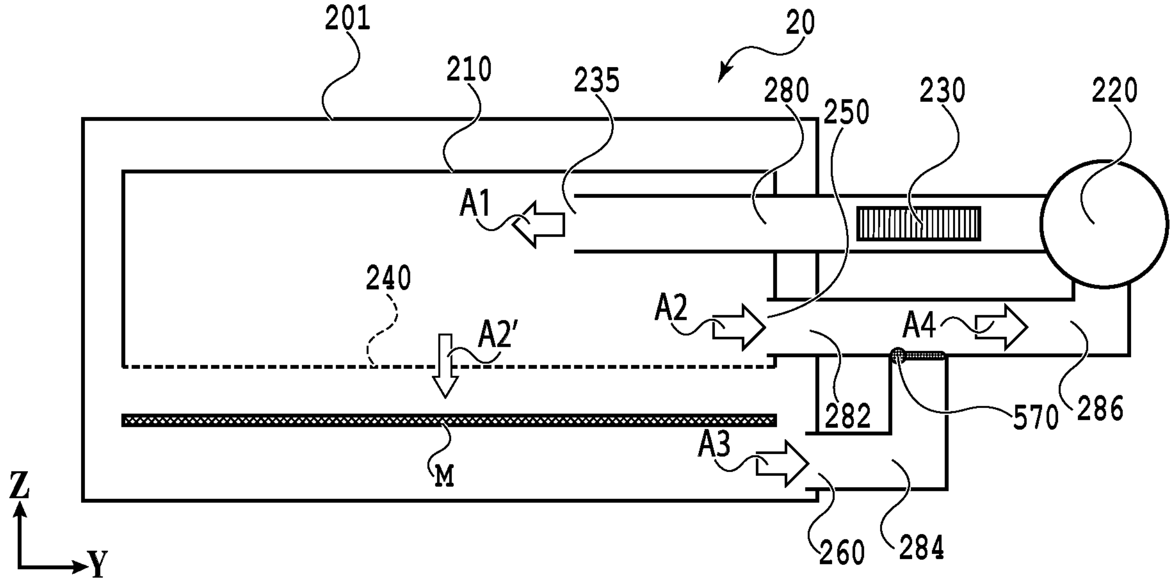
FIG. 7A is a schematic sectional view showing an exhaust amount regulator in a third embodiment.
Figure 7B:
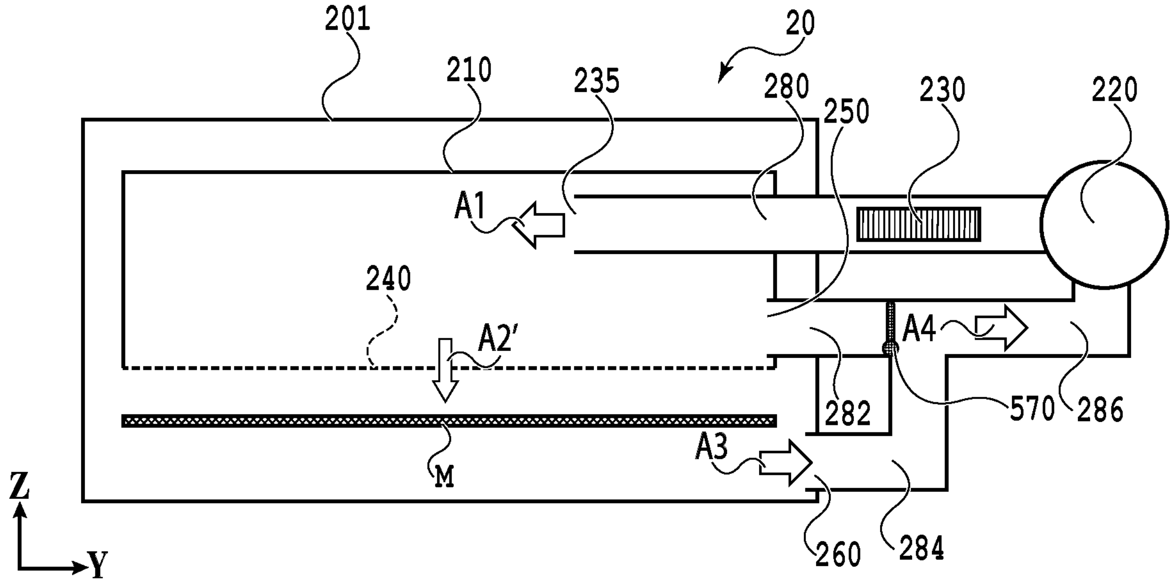
FIG. 7B is a schematic sectional view showing an exhaust amount regulator in a third embodiment.

FIGS. 7A and 7B are sectional views depicting the direction of airflow in the drying unit 20 in a third embodiment. An exhaust amount regulator 570 is formed by a flapper valve 570 disposed in and across the first and second collection paths and configured to switch between the first collection path connecting the first exhaust port 250 to the air blower 220 and the second collection path connecting the second exhaust port 260 to the air blower 220. The exhaust amount regulator 570 is able to turn and switches the regulation state with its valve turning angle. FIG. 7A shows the first regulation state, and FIG. 7B shows the second regulation state.

In the first regulation state shown in FIG. 7A, the exhaust amount regulator 570 opens the first collection path 282 and closes the second collection path 284. Air supplied from the air blower 220 is heated by the heater 230 and is sent in direction A1 as hot air. In this state, the heating temperature for the heater 230 may be set to a temperature higher than the temperature for heating the printing medium. Because the exhaust amount regulator 570 opens the first collection path 282 and closes the second collection path 284, the hot air is next sent in direction A2 from the first exhaust port 250. Air exhausted from the first exhaust port 250 is sent in direction A4 via the exhaust amount regulator 570 and is returned to the air blower 220. Thus, in the first regulation state, hot air is circulated and heated between the air blower 220 and the first portion 210.

In the second regulation state shown in FIG. 7B, the exhaust amount regulator 570 closes the first collection path 282 and opens the second collection path 284. Air supplied from the air blower 220 is heated by the heater 230 and sent in direction A1 as hot air. In this state, the heating temperature for the heater 230 may be set to the temperature for heating the printing medium. Because the exhaust amount regulator 570 closes the first collection path 282 and opens the second collection path 284, the hot air is next sent in direction A2', flows into the second portion through the vent surface 240, heats the printing medium M, and is then sent in direction A3 from the second exhaust port 260. Air exhausted from the second exhaust port 260 is sent in direction A4 through the exhaust amount regulator 570 and is returned to the air blower 220. Thus, in the second regulation state, hot air is circulated between the air blower 220, the first portion 210, and the second portion 222 to heat and dry the printing medium M. According to the present embodiment, the exhaust amount regulator 570 can switch the regulation state with a single valve, and the valve size can be reduced even more.

Fourth Embodiment

FIGS. 8A and 8B are diagrams depicting the direction of airflow in the drying unit 20 in a fourth embodiment. FIG. 8A shows the first regulation state, and FIG. 8B shows the second regulation state. In the fourth embodiment, the drying unit 20 includes an opener-closer 370 provided adjacent to the vent surface 240. The opener-closer 370 is a shield member capable of translational movement relative to the vent surface 240, has a plurality of opening portions H, and opens or closes the plurality of opening portions 245 of the vent surface 240.

In the first regulation state shown in FIG. 8A, the opener-closer 370 closes the vent surface 240. Air supplied from the air blower 220 is heated by the heater 230 and is sent in direction A1 as hot air. In this state, the heating temperature for the heater 230 may be set to a temperature higher than the temperature for heating the printing medium. Because the opener-closer 370 closes the vent surface 240, the hot air is next sent in direction A2 from the first exhaust port 250. Next, the hot air is sent in direction A4 and is returned to the air blower 220. Thus, in the first regulation state, hot air is circulated and heated between the air blower 220 and the first portion 210.

In the second regulation state shown in FIG. 8B, the opener-closer 370 opens the vent surface 240. Air supplied from the air blower 220 is heated by the heater 230 and sent in direction A1 as hot air. In this state, the heating temperature for the heater 230 may be set to the temperature for heating the printing medium. Because the opener-closer 370 opens the vent surface 240, the hot air sent to the first portion 210 is next sent in direction A2' and flows into the second portion through the vent surface 240. The hot air heats the printing medium and is then exhausted from the second exhaust port 260 in direction A3. Air exhausted from the second exhaust port 260 is sent in direction A4 and is returned to the air blower 220. Thus, in the second regulation state, hot air is circulated between the air blower 220, the first portion 210, and the second portion 222 to heat and dry the printing medium M.

Figure 9A:
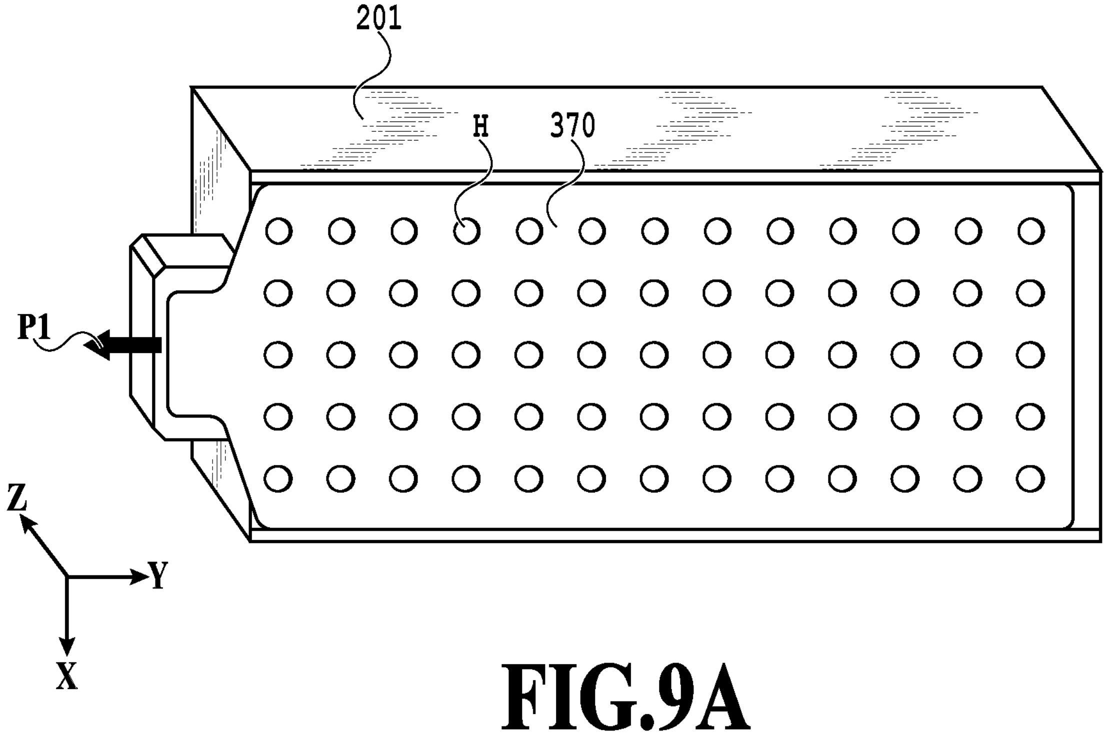
FIG. 9A is a perspective view showing a shield member in the exhaust amount regulator in the fourth embodiment.
Figure 9B:
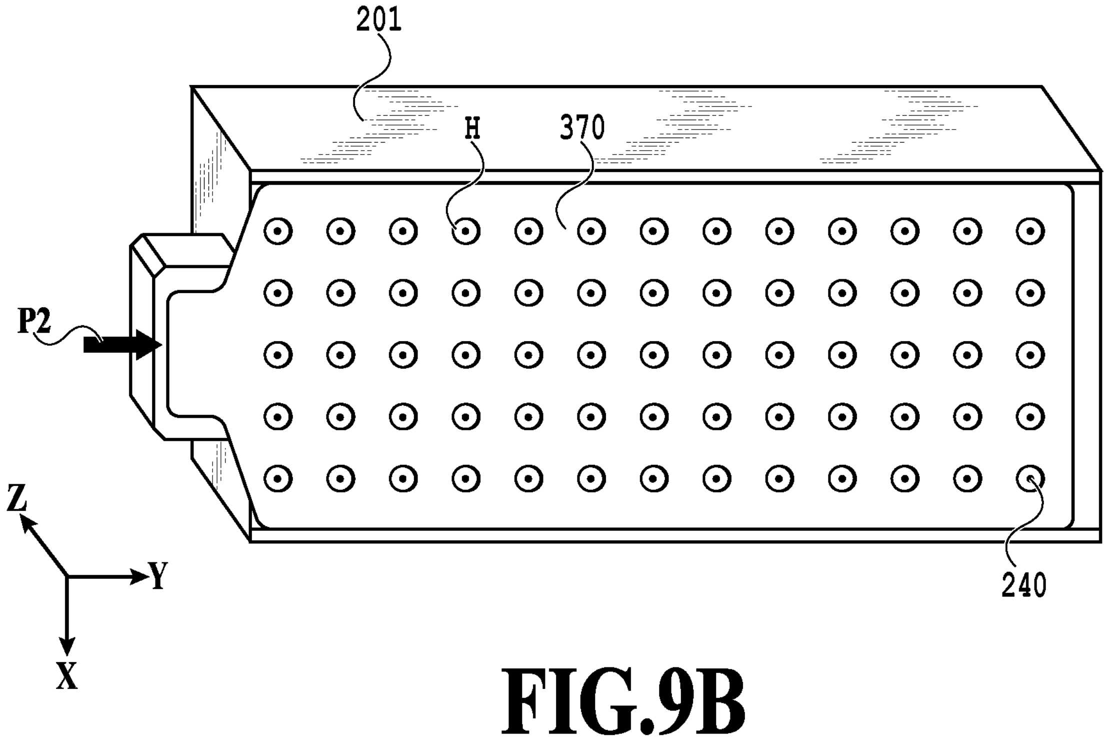
FIG. 9B is a perspective view showing a shield member in the exhaust amount regulator in the fourth embodiment.

FIGS. 9A and 9B show detailed diagrams of the opener-closer 370 in the present embodiment. The opener-closer 370 has the plurality of opening portions H coinciding with the positions of the plurality of the opening portions 245 of the vent surface 240. The opener-closer 370 is a valve which is capable of translational movement (in directions P1 and P2 in FIG. 8A to FIG. 9B) relative to the vent surface 240 as driven by a driving mechanism (not shown) and which is controlled in its degree of opening by positioning of the plurality of opening portions H relative to the plurality of opening portions 245 of the vent surface 240.

FIG. 9A shows the opener-closer 370 in a closed state in the first regulation state, and FIG. 9B shows the opener-closer 370 in an open state in the second regulation state. As shown in FIG. 9A, the opener-closer 370 moves in direction P1 in the closed state. As shown in FIG. 9B, the opener-closer 370 moves in direction P2 in the open state. The configuration of the present embodiment can ensure that hot air may not be blown against the printing medium M.

The opener-closer 370 of the fourth embodiment may be used solely. Alternatively, the opener-closer 370 may be combined with any of the valves of the other embodiments. Although combined with the flapper valve 570 in the third embodiment in FIGS. 8A and 8B, the opener-closer 370 may be used in combination with the first regulation valve **270*a* and the second regulation valve 270*b* in the first embodiment or with the three-way valve 470** in the second embodiment, and makes switching between the first and second regulations state easy.

In any of the embodiments, the drying unit 20 may be configured such that the area of the first exhaust port 250 is larger than the area of the plurality of opening portions 245 of the vent surface 240. Alternatively, in any of the embodiments, the exhaust amount regulator 270 may form an intermediate state, instead of the first and second regulation states described above, where the first and second collection paths are open so that less amount of hot air may pass through the second portion to heat the printing medium. The degree of opening of the first and second collection paths in the intermediate state may be 50%. In any of the embodiments, although the hot air supply port 235, the first exhaust port 250, and the second exhaust port 260 are formed in the Y-direction, the present disclosure is not limited to this, and they may be disposed in various disposition directions and at various disposition angles.

Fifth Embodiment

Figure 10:
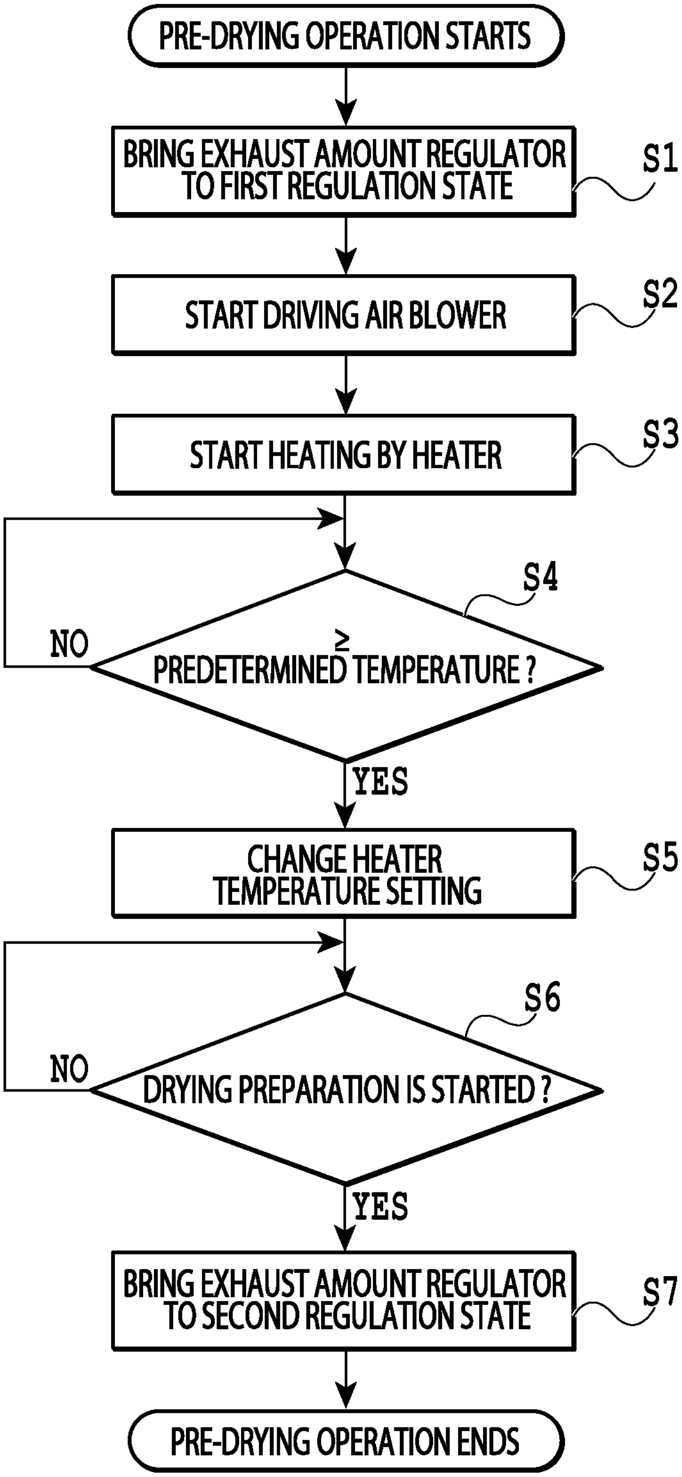
FIG. 10 is a flowchart showing how the drying unit is controlled according to a printing operation.

Next, using the flowchart in FIG. 10, a procedure of how the control unit 11 controls driving of the drying unit 20 is described. Upon receipt of an instruction from the host computer 19 to start a pre-drying operation, the control unit 11 starts an operation of preparing for drying of a printing medium. In Step S1, which is before the drying unit starts drying the printing medium, the control unit 11 brings the drying unit 20 to the first regulation state. In Step S2, the control unit 11 drives the air blower 220 and starts sending and circulating of air between the air blower 220 and the first portion 210, thereby circulating air inside the drying unit. In Step S3, the heater 230 starts heating and heats the circulating air. The heating temperature for the heater 230 in Step S3 is set to a temperature higher than the temperature for heating the printing medium M. If it is determined in Step S4 that the air in the drying unit has reached the temperature set in S3, in Step S5 the heating temperature for the heater 230 is changed to the temperature for drying the printing medium M.

In Step S6, it is determined whether drying preparation has been started. If it is determined that drying preparation has been started, in Step S7 the drying unit 20 is brought to the second regulation state, and the operation to be performed before drying the printing medium M ends. After the printing medium has been heated, the exhaust amount regulator may be brought back to Step S1.

Although the printing medium is inside the drying unit 20 all the time from the above-described pre-drying operation to completion of drying, the above-described steps make it possible to heat the air in a short period of time while reducing damage on the printing medium by controlling blowing of hot air against the printing medium. Specifically, thermal deformation of the printing medium in the dryer is reduced, and in turn, generation of creases resulting from the thermal deformation can be reduced. Also, in a case where a printing medium which has been dried is unwound and used again for printing, influence of heat in drying may be reduced, and quality can be improved. In examples, a warm air state is determined based on whether the temperature of hot air has exceeded the temperature for heating the printing medium and whether the surface temperature of the pressure chamber 210 has exceeded a particular temperature; however, the present disclosure is not limited to this.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-203763, filed Dec. 20, 2022, which is hereby incorporated by reference wherein in its entirety.

What is claimed is:

1. An inkjet printing apparatus comprising:

a printing unit configured to perform printing by ejecting ink to a printing medium; and a drying unit configured to dry the printing medium, wherein the drying unit includes:

an air blower having an entry and an exit, a heater configured to heat air sent from the exit of the air blower, a casing having a first portion configured to communicate with the heater, and a second portion that is configured to communicate with the first portion and is configured to pass the printing medium through the second portion, a first collection path configured to communicate with the first portion and the entry of the air blower, a second collection path configured to communicate with the second portion and the entry of the air blower, and an exhaust amount regulator configured to switch between a first regulation state in which air circulates through the first portion and the first collection path and a second regulation state in which air circulates through the second portion and the second collection path, wherein the exhaust amount regulator is a regulation valve disposed in each of the first and second collection paths.

2. The inkjet printing apparatus according to claim 1, wherein, in the first regulation state, the exhaust amount regulator opens the first collection path and closes the second collection path, and in the second regulation state, the exhaust amount regulator closes the first collection path and opens the second collection path.

3. The inkjet printing apparatus according to claim 2, further comprising:

a vent surface provided between the first and second portions of the casing and having a plurality of opening portions configured to communicate with the first and second portions; and an opener-closer disposed adjacent to the vent surface.

4. The inkjet printing apparatus according to claim 1, wherein the exhaust amount regulator is a three-way valve disposed to exit in both of the first and second collection paths.

5. The inkjet printing apparatus according to claim 1, wherein the exhaust amount regulator is a flapper valve disposed in and across the first and second collection paths.

6. The inkjet printing apparatus according to claim 1, further comprising:

a vent surface provided between the first and second portions of the casing and having a plurality of opening portions configured to communicate with the first and second portions; and an opener-closer disposed adjacent to the vent surface.

7. The inkjet printing apparatus according to claim 6, wherein an area of a first exhaust port of the first collection path disposed at the first portion is larger than an area of the plurality of opening portions of the vent surface.

8. The inkjet printing apparatus according to claim 1, further comprising a control unit configured to control the heater, wherein, in the first regulation state, the control unit controls the heater to heat with a temperature higher than that in the second regulation state.

9. The inkjet printing apparatus according to claim 1, wherein the exhaust amount regulator is controlled to be in the first regulation state before drying of the printing medium is started, controlled to be in the second regulation state while the printing medium is being dried, and controlled to be in the first regulation state after drying of the printing medium is completed.

10. A drying method using an inkjet printing apparatus having a printing unit configured to perform printing by ejecting ink to a printing medium, and a drying unit configured to dry the printing medium, wherein the drying unit includes:

an air blower having an entry and an exit, a heater configured to heat air sent from the exit of the air blower, a casing having a first portion configured to communicate with the heater, and a second portion that is configured to communicate with the first portion and is configured to pass the printing medium through the second portion, a first collection path configured to communicate with the first portion and the entry of the air blower, a second collection path configured to communicate with the second portion and the entry of the air blower, and an exhaust amount regulator configured to switch between a first regulation state in which air circulates through the first portion and the first collection path and a second regulation state in which air circulates through the second portion and the second collection path, the drying method comprising:

receiving an instruction to start a pre-drying operation;

bringing the drying unit to the first regulation state upon the receipt of the instruction to start the pre-drying operation;

starting sending and circulating of air by driving the air blower in the first regulation state;

heating the air with a heating temperature for the heater, wherein the heating temperature is set to a temperature higher than a temperature for heating the printing medium;

determining whether the air has been heated to the set temperature;

changing, in a case where it is determined that the air has been heated to the set temperature, the heating temperature for the heater to the temperature for heating the printing medium; and bringing, in a case where it is determined that drying preparation in response to the instruction has been started, the exhaust amount regulator to the second regulation state.

* * * * *